United States Patent [19]
Purchas

[11] 3,847,820
[45] Nov. 12, 1974

[54] FILTERING APPARATUS

[76] Inventor: Derek Bernard Purchas, Holmcroft Heathside Park Rd., Holmcroft, England

[22] Filed: Apr. 11, 1973

[21] Appl. No.: 350,115

[30] Foreign Application Priority Data
May 17, 1972 Great Britain................. 023069/72

[52] U.S. Cl.................................. 210/457, 210/497
[51] Int. Cl............................................. B01d 29/04
[58] Field of Search ............ 210/232, 489, 497, 457

[56] References Cited
UNITED STATES PATENTS
3,327,864  6/1967  Ball et al........................ 210/497 X
882,393   3/1908  Kramer........................... 210/232 X
802,714   10/1905 Smith................................. 210/489

*Primary Examiner*—Frank A. Spear, Jr.
*Attorney, Agent, or Firm*—Hill, Gross, Simpson, Van Santen, Steadman, Chiara & Simpson

[57] ABSTRACT

A filtering apparatus comprising a substantially rigid hollow cylindrical support member, fluid flow passages connecting the hollow interior of the support member to the cylindrical external surface thereof, and a plain cylinder of filtering material supported by that cylindrical surface of the support member defining the upstream end of the fluid flow passages.

8 Claims, 3 Drawing Figures

PATENTED NOV 12 1974 3,847,820
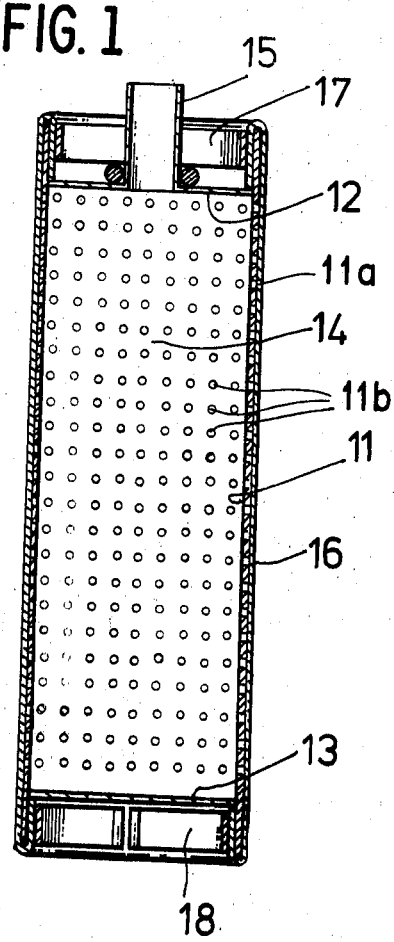
FIG. 1
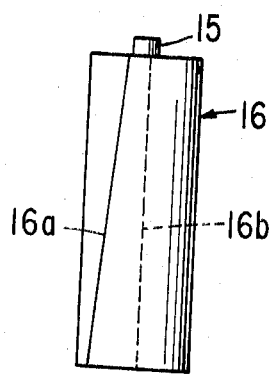
FIG. 2
FIG. 3

FILTERING APPARATUS

The present invention relates to filtering apparatus and has particular application to filtering apparatus utilizing paper as the filtering material.

It is well known to filter particulate matter from a fluid by causing the fluid to flow through a filtering material whereby the particulate matter is retained by the filtering material as the fluid flows therethrough.

It is also well known to utilize paper as a filtering material. In the known constructions for cylindrical paper filters a paper blank is folded or pleated, parallel to one edge, to a "zig-zag" or "concertina" cross-section and the blank is then bent into the form of a hollow cylinder the axis of which lies substantially parallel with the fold or pleat lines. The ends of the blank parallel to the cylindrical axis are then secured together, conveniently by an adhesive.

In operation a cylindrical paper filter of the type defined above is supported at its ends and the fluid flow can be from the outside of the cylinder inwardly to the bore thereof or from the bore of the cylinder outwardly thereof. By virtue of the "zig-zag" or "pleated" configuration of the cylinder wall the surface area of paper exposed to the fluid can be many times greater than the surface area of a plain cylinder of the same maximum diameter as the folded paper cylinder.

A difficulty with the above defined cylindrical paper filter is that foreign matter arrested on one face of the cylinder can affect the free flow of liquid to an adjacent face, such filters are expensive to make and, because of the difficulty in supporting a pleated or folded wall cylinder along its length without complexed and expensive support means, such cylinders are generally left unsupported along their length so that the allowable pressure drop through the cylinder wall is small.

According to the present invention there is provided a filtering apparatus comprising a plain cylinder of filtering material supported by a substantially rigid perforated cylindrical support member.

Preferably the filtering material comprises paper. Alternatively the filtering material may comprise a woven or random fibre filter medium, membrane or other filter material in sheet form.

Preferably the cylinder of filtering material is supported on the outside of the cylindrical support member and, the cylinder of filtering material is made from a plain rectangular blank by bending the blank into a tubular form with one blank edge, parallel to the axis of the tube, overlapping the other edge parallel to the axis of the tube.

The overlapping edges of the blank forming the cylinder may conveniently be secured together by an adhesive therebetween or by an adhesive tape.

Preferably the plain cylinder of filtering material has a greater length than the cylindrical support member and the cylindrical support member has annular recesses in its two ends into which the ends of the cylinder of filtering material are folded. Conveniently, each end of the cylinder of filtering material folded into an annular recess in the cylindrical support member is retained therein by a detachable clip, conveniently an annular spring clip. Preferably, the cylindrical support member comprises a perforated tube having solid end walls, perpendicular to the axis of the tube, spaced inwardly from the tube ends whereby the ends of the tube are opened and defined annular recesses into which the ends of the paper filter can be folded. The perforated tube between the end walls constitutes the filtered fluid chamber and a filtered fluid outlet duct is provided by a tube secured coaxially to one end wall and opening into the filtered fluid chamber.

The invention will now be described further by way of example, with reference to the accompanying drawing and in which:

FIG. 1 is a vertical section through a paper cartridge assembly.

FIG. 2 is an elevational view of the assembly showing the overlap of the paper filter.

FIG. 3 is a plan view of the paper filter in a flat unwrapped state.

In the illustrated example a perforated tube 11 has a planar outer circumferential surface 11a and a myriad of holes 11b therethrough along the length thereof. Imperforate or solid internal walls 12 and 13 are inwardly spaced from the ends of tube 11 to define a filtered fluid chamber 14 therebetween. An outlet duct 15, concentric with the axis of the tube 11, is let into the end wall 12 and the bore of duct 15 is open to the filtered fluid chamber 14.

A plain paper filter 16, having a length greater than the length of tube 11, is applied over the tube 11 until the tube 11 lies substantially central within a cylindrical paper filter 16. The ends of the cylindrical paper filter 16 are then bent over the ends of the tube 11 and into the annular recesses defined by the walls 12 and 13 and said inwardly turned cylinder ends are retained in the open annular ends of the tube 11 by spring clips 17 and 18. Each spring clip 17 or 18 comprises a split ring having a free diameter greater than the internal diameter of the tube 11 so that when compressed, inserted into an open end of tube 11, and released the spring clip 17 or 18 expands to engage the inwardly turned edge regions of the paper filter 16 in the tube end and retain the engaged end of the paper filter 16 against the tube 11.

In operation the filtering arrangement is suspended, conveniently by the outlet duct 15, in a fluid, such as a liquid, and the liquid surrounding the tube 11 flows into tube 11 by passing through the cylinder 16 of filter paper and the perforations in tube 11. As said liquid passes through the cylinder 16 of filter paper the foreign matter in the liquid is deposited on the surface of cylinder 16 and the filtered liquid is extracted from the filtered liquid chamber 14 by way of the duct 15. As the filtering operation proceeds, the accumulation of foreign matter on the surface of the paper filter cylinder 16 reduces the rate of flow through the paper filter and the filter paper cylinder 16 must be replaced when the restriction to flow reaches an unacceptable level.

To replace the filter paper cylinder 16 it is only necessary to remove the spring clips 17 and 18, remove the soiled filtering material 16, apply a new filter paper cylinder 16 to the tube 11, fold over the ends of the cylinder 16, clamp the cylinder 16 in position with the spring clips 17 and 18 and the apparatus is again ready for filtering.

Because the cylinder 16 of filtering material is fully supported along its length, relatively high pressure differences can be applied across the filtering material.

The cartridge filter illustrated in the drawings can be mounted with the filtered liquid outlet at the top of the cartridge, in which case the filtered liquid will evacuate because of the pressure difference across the filtering material or by suction, or the filter outlet 15 may be arranged at the bottom of the cartridge, in which case the filtered liquid can evacuate by gravity feed.

The paper cartridge may be mounted in a housing and a plurality of paper cartridges can be supported in a common foul liquid housing. With such an arrangement the paper cartridges are conveniently supported from the floor or base of the foul liquid housing and the roof of the housing is arranged to be readily detachable from the housing to facilitate replacement of fouled filter paper cylinders.

The cylindrical paper filter 16 is conveniently formed from a rectangular paper blank by simply bending the rectangular blank into a cylindrical form with two parallel side edges of the blank in overlapping relationship parallel to the cylinder axis.

In one form of cylindrical paper filter 16 the overlapping edge of the cylindrical blank is secured to the underlying material by an adhesive or an adhesive tape In another embodiment the cylindrical paper filter 16 is simply wrapped around the tube 11 and no special means are provided for securing together the overlapping edges. When the tube 11, with the cylindrical paper filter 16 therein, is inserted into a liquid, the paper is wetted by the liquid and the wet, overlapping edges are forced into contact by the pressure difference through the filter paper, whereby flow of liquid between the overlapping edges, without passing through the thickness of the paper, is avoided. With this form of filter it has been found advantageous as shown in FIGS. 2 and 3 to cut the overlying paper edge 16a so that said edge does not lie parallel with the axis of the filter as does the underlying edge 16b.

In an alternative arrangement the paper filter cylinder 16 may be retained on the perforated tube 11 by clamping means which act on the outside of the cylinder 16 and tube 11 assembly and, for example, such clamping means may comprise jubilee clips or the like clips capable of exerting a radial clamping force to retain the ends of the filter paper cylinder 16 withe the tube 11.

Although the present invention has been described by way of example with reference to the specific embodiment it will be appreciated that many variations and modifications will be apparent to persons skilled in the art and such embodiment which include a plain paper cylinder supported by a cylindrical support must fall within the scope of this invention.

I claim:

1. A filtering apparatus comprising a rigid tube having a planar outer circumferential surface and a plurality of holes therethrough along the length thereof, imperforate end walls in said tube inwardly from the ends thereof and tightly secured thereto to provide a filtered fluid chamber, a duct extending from one of said end walls communicating with said chamber to drain filtered fluid therefrom, a sheet of filter paper having a length greater than the circumference of the tube and a height greater than the length of the tube wrapped around said tube with one edge overlapping the other edge and having the top and bottom ends folded into the ends of the tube beyond the end walls, and split resilient clamping bands in the folded ends of the filter paper pressing the paper against the tube to lock the paper in tubular form around the tube whereby fluid being filtered will pass through the tubular wrapped paper pressing it against the planar surface of the rigid tube and also pressing together the overlapped edges of the paper.

2. The apparatus of claim 1 wherein the edges of the filter paper extend in the direction of the axis of the rigid tube.

3. The apparatus of claim 1 wherein the edges of the paper extend in the direction of the axis of the rigid tube with one edge in nonparallel relationship with said axis.

4. The apparatus of claim 1 wherein the tube is cylindrical and the filter paper has one edge in nonparallel relation to the other edge providing an overlap of varying width along the length of the tube.

5. A filter apparatus comprising a rigid cylindrical tube having a planar outer circumferential surface and a plurality of holes therethrough along the length thereof, imperforate disks in said cylindrical tube inwardly from the ends thereof and secured to the tube to cooperate therewith for forming a closed ended cylindrical chamber receiving filtered fluid along the length thereof from the perforations of the tube, a duct extending from one of said disks to drain filtered fluid from the chamber, a sheet of filter paper longer than the circumference of the cylindrical tube and higher than the length of the tube wrapped around the tube with overlapping edges and top and bottom ends tucked in the ends of the tube beyond said disks, resilient clamping bands in the ends of the tube pressing the folded in portions of the filter paper tightly against the tube, the edges of said filter paper extending in the direction of the axis of the cylindrical tube in overlapping relation with one edge being in nonparallel relationship with the axis of the tube whereby fluid being filtered into the filter chamber will press the paper tightly around the tube and will simultaneously press the overlapped portion of the paper against the underlapped portion in sealing relation.

6. The apparatus of claim 5 wherein one edge of the paper filter is parallel to the axis of the tube and the other edge of the paper is nonparallel with the axis of the tube.

7. The filter of claim 6 wherein the nonparallel edge of the paper is the overlapping edge.

8. A filter device having a replaceable paper filter sheet which comprises a rigid tube having a cylindrical outer peripheral wall with radial holes therethrough around the circumference and along the length thereof, imperforate walls secured to the tube closing the ends thereof and providing a chamber for filtered liquid in the tube, a drain tube secured to and extending from one of said imperforate walls to remove liquid from said chamber, a paper filter sheet wrapped around said cylindrical wall covering said holes and having free edges in overlapping relation along the length of the tube, and the outer overlapping edge being in nonparallel relation with the tube axis whereby liquid to be filtered will flow through the paper and holes into the chamber while pressing the paper against the cylindrical wall of the tube and also pressing the overlapped edge of the paper against the underlying edge in sealed engagement therewith.

* * * * *